Sept. 9, 1930.  J. H. FOX ET AL  1,775,123
APPARATUS FOR MAKING COMPOSITE GLASS
Filed Dec. 17, 1926  3 Sheets-Sheet 1

INVENTORS
John H. Fox
and
Wm. Owen
by
James C. Bradley
atty

Sept. 9, 1930.  J. H. FOX ET AL  1,775,123
APPARATUS FOR MAKING COMPOSITE GLASS
Filed Dec. 17, 1926   3 Sheets-Sheet 2

INVENTORS
John H. Fox
and
Wm Owen
by James C. Bradley
att

Sept. 9, 1930.   J. H. FOX ET AL   1,775,123
APPARATUS FOR MAKING COMPOSITE GLASS
Filed Dec. 17, 1926   3 Sheets-Sheet 3
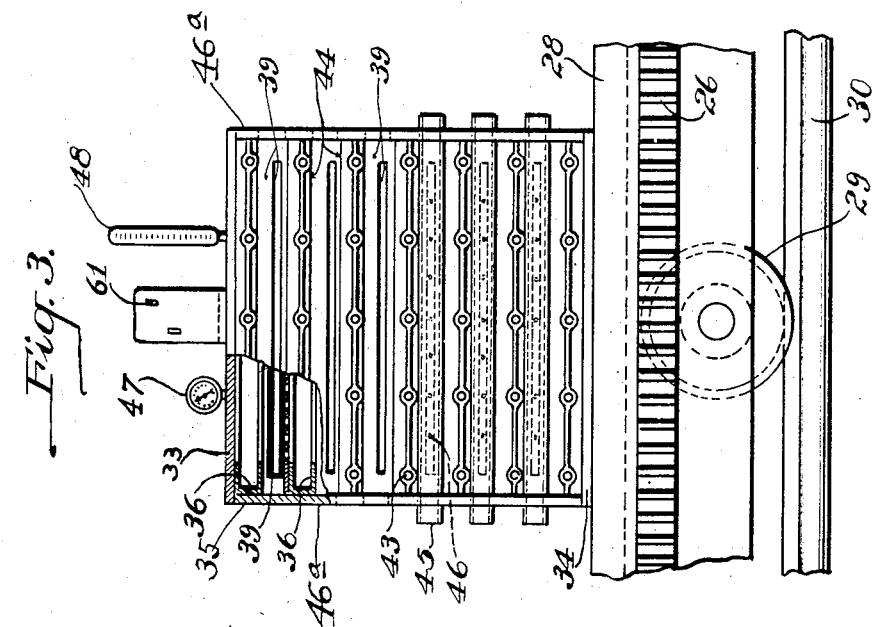
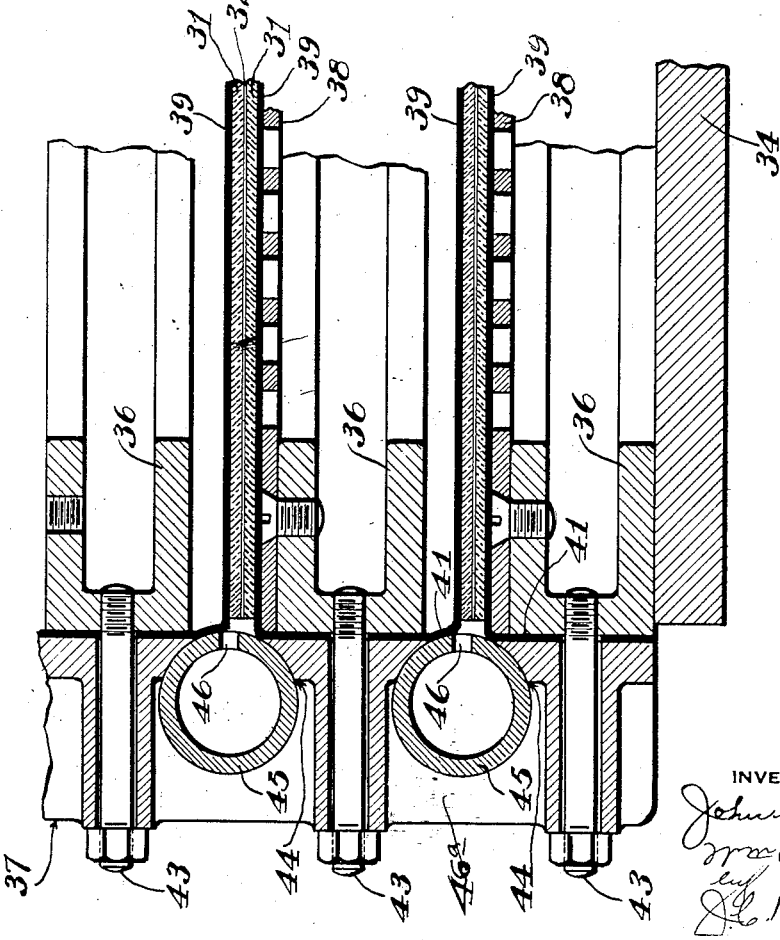
INVENTORS Patented Sept. 9, 1930

1,775,123

UNITED STATES PATENT OFFICE

JOHN H. FOX AND WILLIAM OWEN, OF PITTSBURGH, PENNSYLVANIA, ASSIGNORS TO PITTSBURGH PLATE GLASS COMPANY, A CORPORATION OF PENNSYLVANIA

APPARATUS FOR MAKING COMPOSITE GLASS

Application filed December 17, 1926. Serial No. 155,426.

Figure 1:
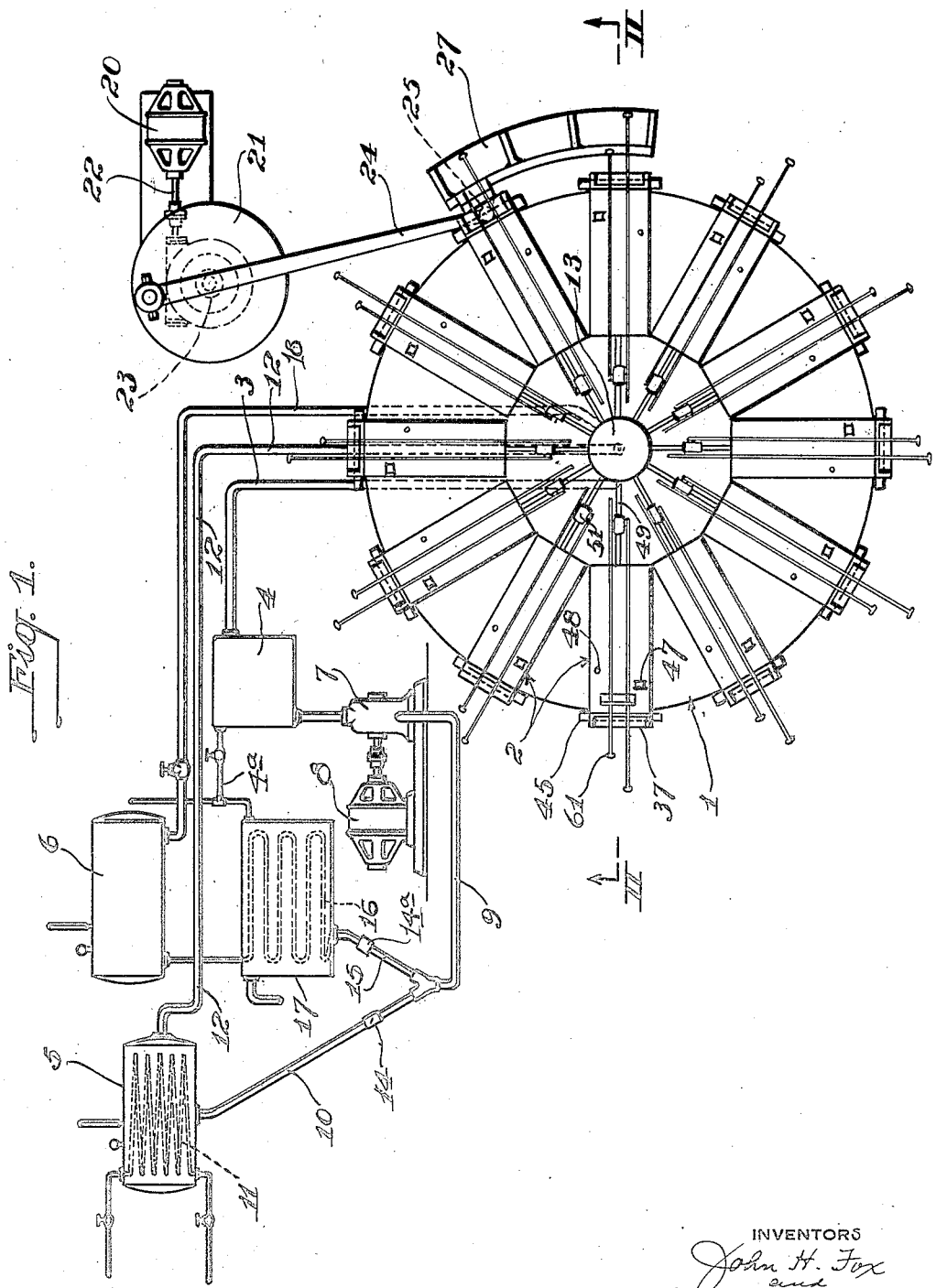
Figure 2:
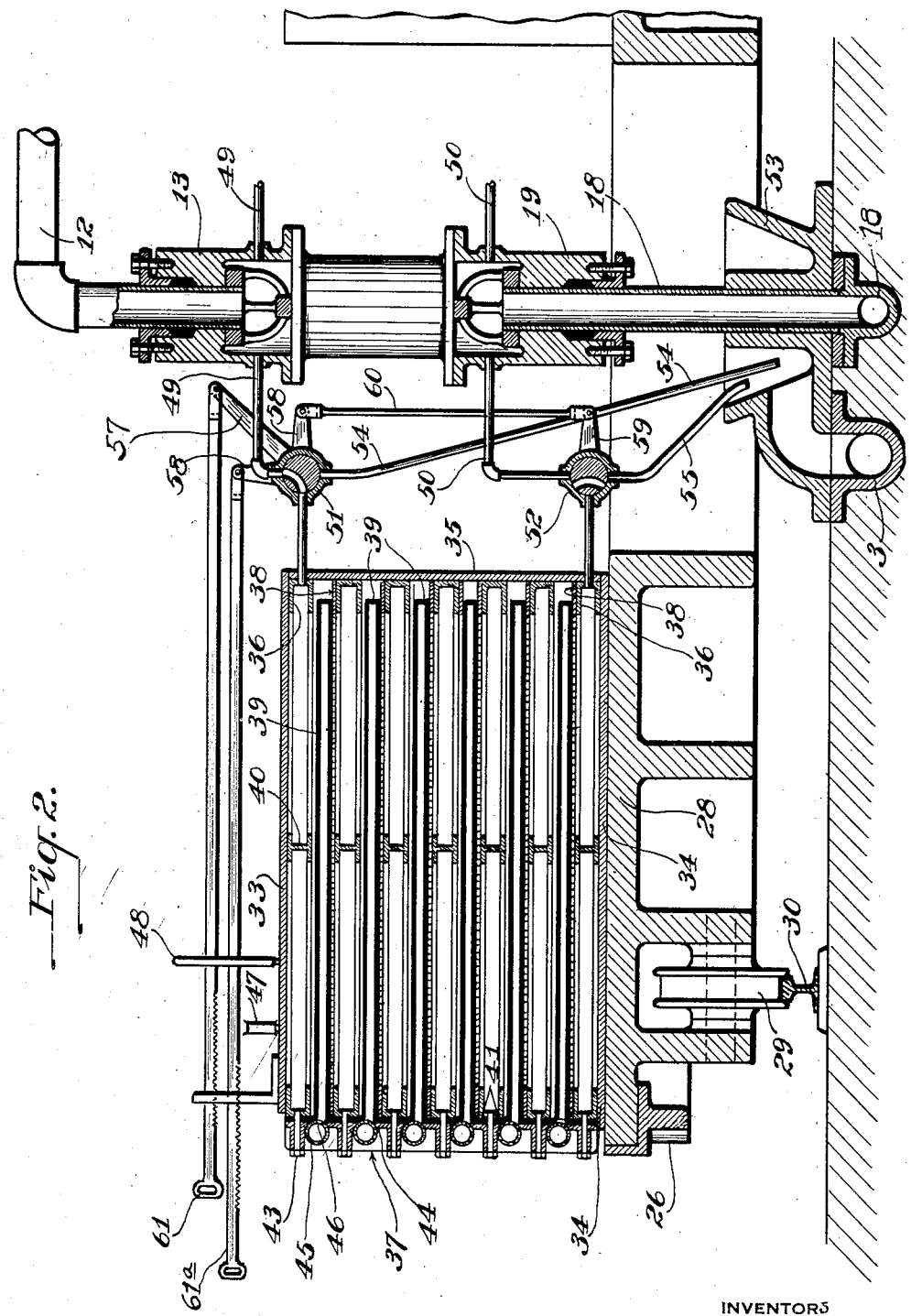

The invention relates to a process and apparatus for making composite glass, and particularly to the process and means for applying heat and pressure to cause the joinder between the glass and celluloid. Composite glass ordinarily comprises two sheets of glass with a sheet of celluloid cemented therebetween, although a greater or less number of layers of material may be employed. It is preferred to assemble the sheets with a coating of cement, such as gelatin dried upon the surfaces of the glass sheets, which are to be cemented to the celluloid, the heat subsequently applied to the assembled sheets serving to soften the gelatin and secure adhesion when pressure is applied, but it will be understood that the apparatus may be used in other ways. For instance, a sufficient amount of heat and pressure will cause the adherence of the celluloid to the glass without the use of any cement, and the invention may be employed in such way, if desired. The invention has for its primary objects the provision of a means and procedure whereby a plurality of composite plates may be formed simultaneously, and whereby quantity production may be secured with a limited number of operatives. One embodiment of the invention is illustrated in the accompanying drawings, wherein:

Figure 1 is a plan view of the apparatus. Fig. 2 is a section on an enlarged scale on the line II—II of Fig. 1. Fig. 3 is a side elevation of the construction of Fig. 2. And Fig. 4 is an enlarged detail section taken through one of the presses in the same plane as the Fig. 2 section.

In carrying out the process, the sheets of glass and celluloid, which are to be formed into the composite plates, are brought into position opposite the turntable 1 carrying the series of presses 2. These plates have been previously treated to prepare them for the pressing operation, such treatment involving the cleaning of the glass and celluloid plates, and the application to one side of each of the glass sheets of a thin film of gelatin or other cement. This cement is of such a character that when a celluloid sheet is placed between the two glass sheets, and heat and pressure applied thereto, the cement will be softened and the sheets will be securely attached together when the composite plate has cooled off, it being desirable that this cooling off should occur while the sheets are maintained under pressure. If gelatin is used as a cement, the temperature ordinarily applied will be about 250 degrees F., and the pressure about 150 pounds per square inch. In carrying out the invention in its preferred form, a plurality of sets of sheets to be joined together, are placed in rubber containers and inserted in a metal tank constructed to withstand the high degree of hydraulic pressure. One set of sheets is placed in each container and the containers are arranged so that they open to the exterior of the tank. Hydraulic pressure is applied to the tank by means of a heated liquid, so that the liquid as thus supplied not only gives the desired degree of pressure, but also provides a medium for softening the gelatin so that the plates are heated and pressed at the one operation. Since the rubber containers open to the exterior of the tank, there is no substantial pressure upon the edges of the plates and any air or excess cement readily flows outward, thus insuring a more perfect union between the glass sheets and the celluloid. The rubber containers are preferably separated in the tank by means of perforated metal plates, which permit of free access of the heated water to both sides of each composite plate. After the water has had an opportunity to heat the composite plates to the desired temperature, such water is gradually withdrawn from the tank, while a flow of cold water is introduced to take the place of the hot water thus withdrawn. The withdrawal and replacement of water is so conducted that pressure is maintained in the tank during the cooling off of the composite plates. By this arrangement, the plates may be cooled off under pressure, and the operation conducted much more rapidly than if no provision were made for speeding up the cooling of the plates. The rotation of the turntable, either continuously, or step by step, gives an opportunity for quantity production, the speed of rotation being such that by the time the turntable has made one revolution, the contents of the tanks are cooled down to such an extent that they may be opened and the plates removed therefrom.

The connections and apparatus for applying hot and cold water under pressure to the tanks will be seen by reference to Fig. 1, wherein, this apparatus is shown in a diagrammatic way. A drain pipe 3 is provided leading from all the tanks on the turntable, as later described, which pipe discharges into the tank 4. The water from this tank is pumped to the hot water pressure tank 5 and the cold water pressure tank 6 by means of the rotary pump 7 driven from the motor 8. The pipes 9 and 10 lead to the tank 5 which is provided with heating means in the form of a steam coil 11. The heated water from this tank is conducted to the various tanks 2 on the turntable by means of the pipe 12, which leads into a header 13, connections being provided from this header to the various tanks 2. A check valve 14 is provided in the pipe 10 for preventing any backflow through this pipe, and suitable automatic means (not shown) are provided for insuring a constant pressure in the tank 5. The cold water tank is supplied by the pump through the pipes 9 and 15, the latter pipe being directed in the form of a coil 16 through a cooling tank 17 so that the water supplied to the tank 6 is of a relatively low temperature. The pipe 15 is also provided with a check valve 14$^a$. The tank 17 is provided with suitable connections for giving a cooling flow of water therethrough. Cold water is supplied from the tank 6 to the various tanks 2 on the turntable by means of the pipe 18 leading to a header 19 (Fig. 2), suitable connections being made from this header to the various tanks, as later described in detail. The tank 6 is also provided with pressure controlling means (not shown) for maintaining a constant pressure.

The turntable carrying the tanks 2 is given a step by step movement of rotation by means of the motor 20, which gives the crank disc 21 a movement of rotation by means of a worm carried on the motor shaft 22 and a worm wheel carried upon the shaft 23, which rotates the disc 21. The crank disc has a connecting rod 24 provided with a spring pressed dog 25, which engages a rack 26 (Fig. 2) around the periphery of the turntable. The free end of the connecting rod 24 is guided in its movement by means of the guide shoe 27 and the movement of the rod is such that the turntable 1 is rotated one-twelfth of a revolution for each rotation of the disc 21. The turntable 1 is preferably in the form of a casting 28, as indicated in Fig. 2, being supported adjacent its periphery by a series of wheels 29 riding upon the track 30.

The construction of each of the tanks 2 is the same and will be understood by reference to Figs. 2, 3 and 4. As shown, these tanks are arranged to carry six sets of sheets, but this may be varied to meet requirements. The sheets of glass and celluloid are arranged as indicated in Fig. 4, 31, 31 being the glass sheets and 32 being the celluloid sheet lying therebetween. The tanks are made of rectangular shape and have top and bottom walls 33 and 34 and side walls 35, all of sheet metal of a suitable degree of thickness. The side walls are stiffened by means of the series of channels 36 arranged one above the other, as indicated in Fig. 2, the channels being welded to the plates 35. Continuations of these channels also project across the left hand end of the tank (Fig. 2), but at this side, there is no side plate corresponding to the plate 35. The sets of glass and celluloid plates are inserted from this side of the tank, after which a closure is made by means of the pipes 45, later described. Supported upon the upper sides of each of the channels 36 is a perforated plate 38, such plates being welded or riveted to the channels and serving as additional stiffeners. These plates also serve as supports for the rubber containers or bags 39, which open to the exterior of the tank as indicated in Figs. 2 and 4. Transverse stiffeners for the tank are also provided in the form of the H-sections 40, which are welded or riveted to the top and bottom plates 33 and 34 and to the perforated plates 38. This construction gives a tank of sufficient rigidity to withstand the hydraulic pressure required in carrying out the operation.

The outer ends of the rubber containers 39 are turned outwardly, as indicated at 41, 41 in Fig. 4, and such ends are clamped against the faces of the channels 36 by means of the header 37 held securely in position by means of the bolts 43. These headers are provided with transverse slots 44 opposite the open ends of the rubber containers 39, and when hydraulic pressure is to be applied to the tank, the pipes 45 are positioned, as indicated in Figs. 2 and 4, with their inner edges resting against the turned out portions 41 of the rubber containers. These pipes serve to prevent the rubber containers from bulging out through the slots 44 when hydraulic pressure is applied. At the same time, communications from the interior of the containers to the atmosphere is provided by means of the perforations or slots 46 in the pipes, such pipes being open to the atmosphere at their outer ends. The pipes are held in position by the flanges 46$^a$, 46$^a$ which are perforated to permit the passage of the ends of the pipes. Each tank is provided with a pressure gage 47 and a thermometer 48, so that the conditions under which the tank is operating may be observed.

The connections on the turntable between the headers 13 and 19 will be seen by reference to Fig. 2, the upper header being supplied with hot water under pressure through the pipe 12, and the lower header being supplied with cold water under pressure through the pipe 18. The branch pipes 49 and 50 lead from the headers to the three-way valves 51 and 52 with which each tank is provided. Drainage from the tank to the receptacle 53 is provided by means of the pipes 54 and 55 and the receptacle 53 is connected to the return pipe 3 (Fig. 1) so that the water may be returned to the drain tank 4 (Fig. 1) for reuse, as heretofore explained. Additional cold water may be supplied to the system from time to time to take the place of that lost in operation by means of a pipe 4$^a$ leading from a supply main to the tank 4. The stem of the valve 51 is provided with a lever 57 for turning it, and the end of the stem also acts as a pivot for the bell crank lever 58. The valve 52 is provided with the lever 59, connected to the lever 58 by means of the rod 60. Control rods 61 and 61$^a$ are connected to the levers 57 and 58.

The parts are shown in operating position in Fig. 2, each of the containers 39 carrying a set of sheets to be joined together and the valve 51 being in position to admit hot water under pressure to the tank. The parts are allowed to remain in this position until the containers 39 and the composite plates carried thereby reach the desired temperature necessary for softening the gelatin. The rod 61 is now moved to the left to shut off the supply of hot water, and the valve 52 is opened so that a small amount of cold water is introduced into the tank. At this time, the valve 51 is moved a correspondingly slight degree to give communication with the drain pipe 54, so that as cold water is applied to the lower part of the tank, hot water is withdrawn from the upper part of the tank. The rapidity with which this substitution occurs will vary depending upon pressures and the size of the tank, the wider the opening of the valves, the more rapid the cooling of the tank and its contents. This condition is maintained until the composite plates in the containers 39 are given the amount of cooling required, after which the valves are moved so as to cut off all pressure to the tank and allow it to drain. The pipes 45 are then removed from the header 37, giving an opportunity to remove the composite plates from the containers 39, after which a new set of plates to be cemented together is inserted in each container and the pipes 45 replaced, thus completing the cycle.

What I claim is:

1. Apparatus for applying heat and pressure to a set of sheets to be joined together, comprising a pressure tank having a slot through one side, a shelf in the tank in alinement with the slot, a flat rubber container supported on the shelf with its end extending through said slot and secured against the outer surface of the tank, a removable closure member extending longitudinally of said slot and closing the end of the container, means for securing the closure member in position, and means for applying hydraulic pressure to the tank.

2. Apparatus for applying heat and pressure to a set of sheets to be joined together, comprising a tank provided with a plurality of horizontal shelves, a flexible container on each shelf opening through the side of the tank and each adapted to carry a set of sheets, a removable closure for the open end of each container, means for securing the closure to the tank, and means for applying hydraulic pressure to the tank.

3. Apparatus for applying heat and pressure to a set of sheets to be joined together, comprising a tank having a plurality of horizontal slots through one side and provided with a plurality of horizontal shelves, each lying just below the level of one of the slots, a flexible container on each shelf opening through one of said slots, a removable closure for each slot, and means for applying hydraulic pressure to the tank.

4. Apparatus for applying heat and pressure to a set of sheets to be joined together comprising a tank having a side wall with a plurality of parallel slots therethrough and provided with a plurality of communicating compartments, each opening through one of said slots, a flexible container in each compartment also opening through one of said slots and each adapted to carry a set of sheets, and a header secured over the open side of the tank, arranged so as to clamp the ends to the flexible containers against the outer face of said side wall of the tank, the said header being slotted opposite the end of each container to permit the insertion of the set of sheets therein.

5. Apparatus for applying heat and pressure to a set of sheets to be joined together comprising a tank having a side wall with a plurality of parallel slots therethrough and provided with a plurality of communicating compartments, each opening through one of said slots, a flexible container in each compartment also opening through one of said slots and each adapted to carry a set of sheets, and a header secured over the open side of the tank, arranged so as to clamp the ends to the flexible containers against the outer face of said side wall of the tank, and provided with slots opposite the ends of said containers, and pipes releasably carried by the header in opposition to said slots for holding the ends of said containers against outward movement when hydraulic pressure is applied to the tank, the said pipes being provided with openings on their sides next to the ends of said containers.

6. Apparatus for applying heat and pressure to a set of sheets to be joined together comprising a sheet metal tank open on one side, stiffeners for the vertical side walls in the form of commercial sections with inwardly projecting flanges extending around the interior of the tank and spaced one above the other, perforated plates supported on said inwardly projecting flanges and dividing the tank into a series of shallow compartments one above the other, a flexible container in each compartment opening through the open side of the tank, a header secured over the open side of the tank and slotted opposite the open ends of said containers, and means for applying hydraulic pressure to the tank.

In testimony whereof, we have hereunto subscribed our names.

JOHN H. FOX.
WILLIAM OWEN.